United States Patent Office 3,422,187
Patented Jan. 14, 1969

1

3,422,187
INFLUENZA VACCINES AND PROCESS FOR THEIR MANUFACTURE

Kurt Herzberg, Frankfurt am Main, Germany, assignor to Behringwerke Aktiengesellschaft, Marburg an der Lahn, Germany, a corporation of Germany No Drawing. Filed Apr. 16, 1965, Ser. No. 448,855

Claims priority, application Germany, Apr. 23, 1964, B 76,450

U.S. Cl. 424—89 6 Claims

Int. Cl. A61k *23/02;* C12k *5/00*

ABSTRACT OF THE DISCLOSURE

A method for making influenza vaccine from the allantoic liquid of incubated hens' eggs using viruses priorly stabilized against modification of their pathogenicity to the epithelia of the mammalian respiratory tract on passage through hens' eggs. The viruses are priorly stabilized by repeated cultivation in mammalian pulmonary tissue.

The present invention relates to influenza vaccines and a process for their manufacture.

It is already known that influenza viruses can be cultivated in hens' eggs. This method, however, has the drawback that the protective effect of the influenza virus decreases on passage through eggs so that by this method an influenza virus is obtained from which a vaccine showing only an unsatisfactory protective effect can be produced.

Attempts have likewise been made to cultivate influenza viruses in mice and to produce a vaccine from the pulmonary tissue. During passages through mice, the protective effect of the influenza virus remains stable, but from the technical point of view it is difficult to obtain large quantities of influenza virus from mice.

Now I have found a process for producing influenza vaccines wherein influenza viruses pathogenic towards the epithelia of the respiratory tract of mammalia are cultivated in the pulmonary tissue of mammalia by a sufficient number of passages so that in later passages through incubated eggs their pathogenicity towards the epithelia of the respiratory tract is not modified further. The viruses are then passed into incubated fertile eggs, the virus is allowed to multiply therein, a vaccine is prepared in known manner from the virus-containing allantoic liquid and, if desired, an adjuvent is added.

According to the invention, there may be used as influenza viruses, for example, the influenza virus types A, B and C with their strains, for example, $A/PR_8$, $A_1/FM_1$, $A_1$/Ann Arbor, $A_2$/Asia, $A_2$/Japan, B/Stockholm, B/Johannesburg, B/Maryland, B/Lee, or C/Taylor.

As pulmonary tissues of mammalia in which the influenza viruses can be cultivated, until in subsequent passages through incubated eggs their pathogenicity towards the epithelia of the respiratory tract is not further affected, there may be used especially those of mice, ferrets, Guinea pigs, rats, horses or pigs. The influenza viruses can be cultivated in mice for instance according to C. E. van Rooyen and A. J. Rhodes, Virus Diseases of Man (Nelson, New York 1948) pages 602 and 603. Tissue cultures of pulmonary tissues can also be used with success for multiplying the influenza viruses.

In order to obtain virus material for the preparation of a vaccine according to the present invention, viruses which have been passed through mice, for example, until they retain pathogenicity on passage through incubated eggs, are introduced into an incubated fertile hen's egg. Cultivation in the egg can be carried out, for instance, according to C. E. van Rooyen and A. J. Rhodes, Virus Diseases of Man (Nelson, New York 1948), pages 616 to

2

621. A preferred embodiment of the process of the present invention consists in infecting the fertile preliminarily incubated hen's egg by injecting 0.01 to 0.5 milliliter, preferably 0.1 milliliter, of a suspension of influenza viruses in a dilution of up to $10^{-9}$, preferably of $10^{-4}$, into the allantoic cavity between the 6th and the 12th day of incubation, preferably the 8th or 9th day. As a dilutent there may be used any isotonic solution, for instance, a Tyrode's common salt solution, a physiological NaCl-solution, a phosphate-buffered common salt solution of a pH-value of 7, a Hank's solution or an Earle's solution. The virus is then allowed to multiply by incubating the infected hens' eggs at temperatures between 28 and 38° C., preferably between 32 and 36.5° C. It is suitable to collect the liquid egg content (allantoic liquid) at the end of two days. This allantoic liquid can be used in known manner for the preparation of a vaccine. It can likewise be used for further passages through hens' eggs. For the preparation of a vaccine the allantoic liquids are used unmodified or after having been precleaned, for example filtered through a clarifying layer, and/or concentrated, for instance by ultracentrifugation or chromatography. For example, when employing ultracentrifugation, the sediment can be taken up in an isotonic solution, for instance, a Tyrode's common salt solution. Subsequently, it is possible to add, for example, an inactivating agent and/or a preserving agent and, if desired, an adjuvant. As adjuvants, aluminum phosphate, alum, incomplete Freund's adjuvant, or preferably, aluminum hydroxide. The quantities of adjuvant to be added may vary between about 0.1 and about 2%, preferably between 0.3 and 1%, particularly if aluminum hydroxide is used.

As inactivating agent formaldehyde is preferably used. After inactivation, the non-consumed formaldehyde is chemically bound by combination with, suitably, 1½ times the stoichiometric amount of sodium bisulfite. Hydroxylamine, ultra-violet rays, β-propiolactam and the like are also suitable for the inactivation. The titer of the individual influenza virus strains of the vaccines obtained according to the process of the present invention may amount to a range between about 100 and about 5000 HAE/milliliter, preferably between 1000 and 3000 HAE/milliliter. According to the purpose for which the vaccines are to be used, the titer ranges may be reduced or exceeded to any amount.

The effect of the vaccine prepared from influenza viruses cultivated according to the invention, is determined in the "direct mice protection test." The evaluation of immunity caused by the vaccine is based on the extent of modifications provoked in the lungs and on the number of surviving mice. It has been found that for the evaluation of the protective effect this "direct mice protection test" is decisive, and not the hemagglutination inhibiting test, because in the hemagglutination test different influenza vaccines may prove to be equivalent which in the mice protection test show significant differences. For determining the efficiency of the vaccine, the NIH-test is likewise suitable. (Minimum requirements: Influenza virus vaccines. Published by U.S. Department of Health, Education and Welfare, Public Health Service National Institutes of Health, Bethesda, Md., U.S.A., 6th revision, of May 15, 1947, §4.2.) For carrying out the mice protection test, it is suitable to proceed as follows:

Mice of a body weight of 25 grams each are intraperitoneally immunized by means of 0.25 milliliter each of the virus suspension to be determined. After a period of at least 40 days, the immunized mice are rhinally infected with virus-containing ground pulmonary tissue. To this end, two lungs of mice rhinally infected 48 hours earlier are triturated by means of sand and diluted with Tyrode's common salt solution at a ratio of 1:10. After settling, the supernatant fluid is centrifuged for 10 minutes at 3000 r.p.m. and the supernatant fluid remaining after centrifugation is diluted at a ratio of 1:100. The titer of this solution amounts to 10,000 lethal doses/milliliter. For infection, the mice are narcotized by means of ether and their noses are dipped several times over a period of 4 seconds into the dilution containing the virus obtained after the passage through mice lungs. 20 normal mice are infected for control. Dead mice are dissected and the lung findings are registered. After 12 days the surviving mice are killed by means of ether and dissected. At the latest, the findings regarding the lungs are read off one hour after dissection and evaluated according to a scale reaching from zero to four. The indicated value is the arithmetical means of all findings.

The following evaluation scale contains the lung modifications, the numerical values and the degree of immunity.

|  | Numerical value | Degree of immunity |
| --- | --- | --- |
| Total lung pneumonic | 4 | No immunity. |
| Three quarters of lung pneumonic | 3 | Do. |
| Half lung pneumonic | 2 | Weak, partial immunity. |
| 1 quarter of lung pneumonic | 1 | Distinct partial immunity. |
| 1 eighth of lung pneumonic | 1 | Strong partial immunity. |
| Slight spots to negative | 0.25–0 | Strong partial to complete immunity. |

The virus concentration can be determined by hemagglutination, i.e. by the agglutination of chicken erythrocytes when contacted with virus-containing solutions. The units reported in this test are designated by HAE and referred to 1 milliliter. The influenza virus $A_2$/Asia cultivated according to the present invention, for example, shows a hemagglutination titer of at least 2560/milliliter.

The high antigenicity of the viruses present in the vaccines of the present invention has been demonstrated, for example, in twenty children vaccinated with the vaccine produced according to the present invention containing 2000 HAE-units of antigen per dosis. All children show a formation of antibodies after the first vaccination, i.e. the formation of antibodies amounts to 100%. When adults are vaccinated with the same amount of a known influenza vaccine (Heller, L., Körtof, B., Mörner, J. and Zetenberg, B., Nord. Med. 60, 1706 (1958) and Heller, L., Bull. WHO 20, 377 (1959), only 68% of the vaccinated persons show antibodies after 1 vaccination, and only 78% after 2 vaccinations. This activity is the more important, since children are more difficult to immunize against influenza than adults.

The vaccines produced according to the process of the present invention have the advantage that the virus quantities demanded by production on a large scale can be obtained in a simple manner in the laboratory with a minimum of labor and cost. Since it was known that the antigenicity of the influenza virus is badly affected by passages through eggs, it was to be expected that influenza virus cultivated by passages through mice would likewise be unfavorably affected when passed through eggs. It was, therefore, surprising that antigenicity was fully maintained.

The following examples serve to illustrate the invention but they are not intended to limit it thereto.

Example 1

(a) 40 milliliters of a mixed allantoic liquid containing influenza viruses of the $A_2$/Asian strain Singapore cultivated by means of 81 passages through incubated eggs are mixed with 20 milliliters of phosphate buffer of pH 7.0 and shaken for 30 minutes in shaking equipment.

(b) 40 milliliters of a mixed allantoic liquid containing influenza viruses of the $A_2$/Asia strain Singapore cultivated by means of 424 passages through mice lungs and subsequently 33 passages through incubated eggs are mixed with 20 milliliters of phosphate buffer of a pH-value of 7.0 and shaken for 30 minutes in shaking equipment.

(c) 40 milliliters of a mixed allantoic liquid containing influenza viruses of the $A_2$/Asian strain Singapore cultivated by means of 81 passages through incubated eggs are shaken with 20 milliliters of phosphate-buffered aluminium-hydroxide of a pH-value of 7.0 and shaken for 30 minutes in shaking equipment.

(d) 40 milliliters of mixed allantoic liquid containing influenza viruses of the $A_2$/Asia strain Singapore, cultivated by 424 passages through the pulmonary tissue of mice and 33 passages through incubated eggs are mixed with 20 milliliters of phosphate-buffered aluminium hydroxide of pH 7.0 and shaken for 30 minutes in shaking equipment.

The four vaccines show equal virus concentration (850 HAE/ml.). They are tested in the direct mice protection test. With the vaccines (a) and (b) the challenge infection is carried out after 99 days, with vaccines (c) and (d) after 100 days. The results are to be seen from the following table:

DIRECT MICE PROTECTION TEST

| Type of vaccine | Surviving animals | | Average necropsy of surviving and dead animals | Findings of surviving animals | Necropsy findings 0.25–0 |
| --- | --- | --- | --- | --- | --- |
| Incubated egg passage, series 81 | 11/20 | 55% | 2.44 | 1.39 | 1/20 |
| Passage through pulmonary tissue of mice and incubated eggs, series 424/33 | 18/20 | 90% | 1.15 | 0.88 | 7/20 |
| Passage through incubated eggs,—series 81, with Al(OH)₃ | 17/20 | 85% | 1.19 | 0.69 | 6/20 |
| Passage through pulmonary tissue of mice and incubated eggs series 424/33 with Al(OH)₃ | 20/20 | 100% | 0.39 | 0.39 | 13/20 |
| Controls | 0/20 | | 3.83 | | 0/20 |

The table shows that from the two pairs of vaccines the types (a) and (c) of the pure allantois series provoke less immunity than the vaccines (b) and (d) obtained from viruses multiplied in mice lungs before being passed into the allantois series. The increased effect is evident from the number of surviving mice, the figures of average autopsy findings and the frequency of the findings "0.25 to 0 (strong partial to complete immunity)."

The data given in the table prove the superiority of the influenza viruses cultivated according to the process of the present invention in comparison with egg-adapted viruses cultivated according to the state of the art. The differences are particularly noticeable with vaccine (b) in comparison with vaccine (a), but are also distinctly clear when comparing vaccine (d) to vaccine (c).

Example 2

To 5 milliliters of a mixed allantoic liquid containing an influenza virus resulting from 454 passages through lungs of mice and 29 passages through incubated eggs, 45 milliliters of Tyrode's common salt solution (1:10) are added and the whole is mixed with 50 milliliters of Al(OH)₃. Thereby the allantoic liquid is diluted at a ratio of 1:20, the dilution containing 32 HAE/0.25 ml.; the Al(OH)₃-content amounts to 0.75%.

The vaccine is evaluated in 6 mice in the direct mice protection test; the challenge infection is carried out 102 days later. The vaccine confers total protection. All mice subjected to the challenge infection survive and the medium autopsy findings of the lungs amount to only 0.25–0.

The evaluation shows that the influenza virus cultivated according to the process of the present invention even in a dilution of 1:20 still permits the production of a vaccine conferring complete immunity.

A test batch correspondingly carried out with an allantoic dilution of 1:40 (16 HAE/0.25 ml.) still brings about a protection of 80% (1 of 6 mice dies). The average autopsy findings amount to 0.85 and with four of the six mice the autopsy findings show values between 0.25 and 0. Thus, in spite of a forty-fold dilution of the allantoic liquid the immunity conferred is at least equal to the immunity provoked by the vaccine produced according to the state of the art as indicated in Example 1(c) with undiluted allantoic liquid of the pure incubated egg-passage series.

A vaccine of the same virus containing the allantoic liquid in a final dilution of 1:16—40 HAE/0.25 ml. of vaccine—and 0.1% of $Al(OH)_3$, protects all six mice completely. The average autopsy findings amount to about 0.25; with five of the six mice the findings are between 0.25 and 0. This vaccine composition likewise shows that the viruses cultivated according to the process of the present invention cause a good immunity protection.

Example 3

To 100 milliliters of an allantoic liquid whose viruses were purified from (unspecific) accompanying substances by double ultra-centrifugation (1 hour at 20,000 r.p.m.) and taking up of the sediment in phosphate buffer of pH 7.0, 0.037% of formaldehyde is added, the solution is allowed to stand for 12 hours at 20° C. and $Al(OH)_3$ is then added until a concentration of 0.5 is attained. In the direct mice protection test the following values are obtained:

| Direct mice protection tests: | |
|---|---|
| Challenge infection after (days) | 41 |
| Dead mice | 0.25 |
| Average autopsy findings of surviving and dead animals | 0.21 |
| Autopsy finding 0.25–0 | 22/25 |

The results show that the virus cultivated according to the process of the present invention likewise confers a good protection if the virus is inactivated by means of formaldehyde.

Example 4

After 166 passages through mice, an influenza virus type B strain Marburg 5, the titer amounts to $10^{-3}$–$10^{-4}$ of units lethal to mice per milliliter—is passed into a hen's egg, the allantoic liquid is collected and an aluminium-hydroxide-adsorbate vaccine is prepared, by a further passage through eggs and the use of buffered $Al(OH)_3$. 24 mice are immunized by means of this vaccine and 40 days after the immunization infected with 100 lethal doses.

All mice survive. At the 12th day 20 of them show lung-findings between 0.25 and 0 (strong partial to complete immunity). Upon infection of 15 control mice, 14 die.

I claim:

1. In a process for the manufacture of influenza vaccine from the allantoic liquid of incubated fertile hens' eggs containing influenza viruses pathogenic toward the epithelia of the mammalian respiratory tract, the improvement wherein said viruses are first repeatedly cultivated in mammalian pulmonary tissue until subsequent trial passage of a portion of said viruses through eggs shows the viruses to be stable against modification, on such passage through eggs, of their pathogenicity toward the epithelia of the mammalian respiratory tract.

2. A process as in claim 1 wherein said virus-containing allantoic liquid is ultracentrifuged during preparation of said vaccine.

3. A process as in claim 1 wherein said virus-containing allantoic liquid is chromatographed during preparation of said vaccine.

4. A process as in claim 1 wherein said vaccine is inactivated with a member of the group consisting of formaldehyde, hydroxylamine, and β-propiolactam.

5. A process as in claim 1 wherein said vaccine is inactivated by ultra-violet rays.

6. A process as in claim 1 wherein said vaccine contains an adjuvant selected from the group consisting of aluminum phosphate, alum, aluminum hydroxide, and incomplete Freund's adjuvant.

References Cited

Burnet: Scientific American, vol. 196, No. 2, pp. 37–43, February 1957, 167–79P.

Davenport, et al.: Proc. Soc. Exp. Biol. Med., vol. 96, No. 6, pp. 835–850, December 1957.

Hinz et al.: Proc. Soc. Exp. Biol. Med., vol. 101, No. 1, pp. 19–25, May 1959, 167–78P.

Knight: Science, vol. 101, No. 2618, pp. 231 and 232, March 1945, 167–78P.

Veterinary Bulletin: vol. 25, entry 1980, 1955, citing Ginsberg.

J. Exp. Med.: vol. 100, pp. 581–603, 1954.

RICHARD L. HUFF, *Primary Examiner.*

U.S. Cl. X.R.

195—1.3